March 18, 1924.
E. J. BRAISTED
VENTILATOR FOR VEHICLES
Filed March 24, 1923
1,487,507
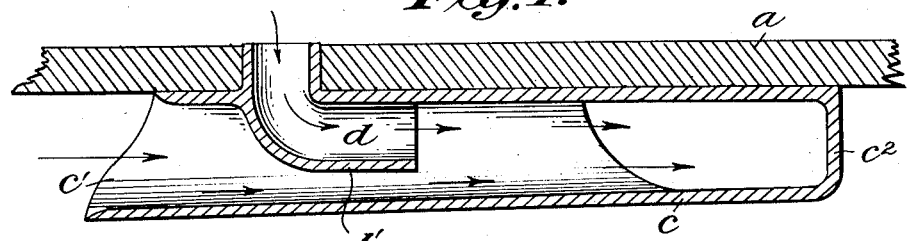
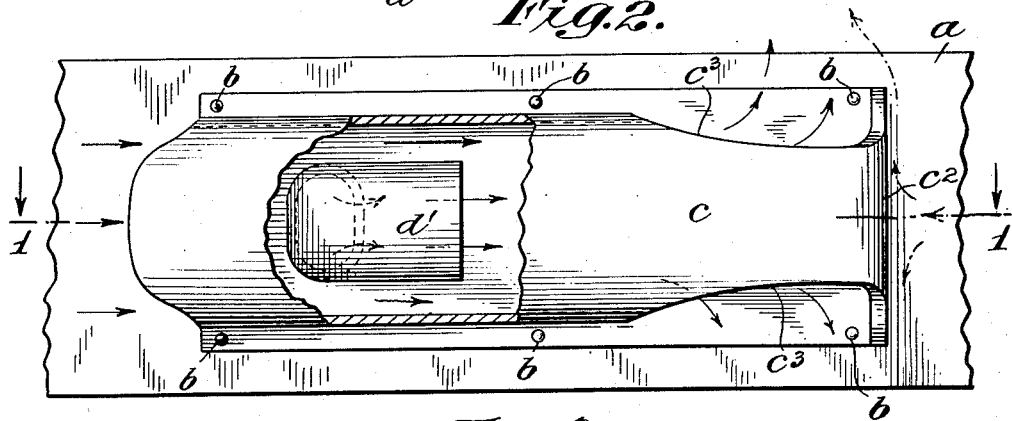
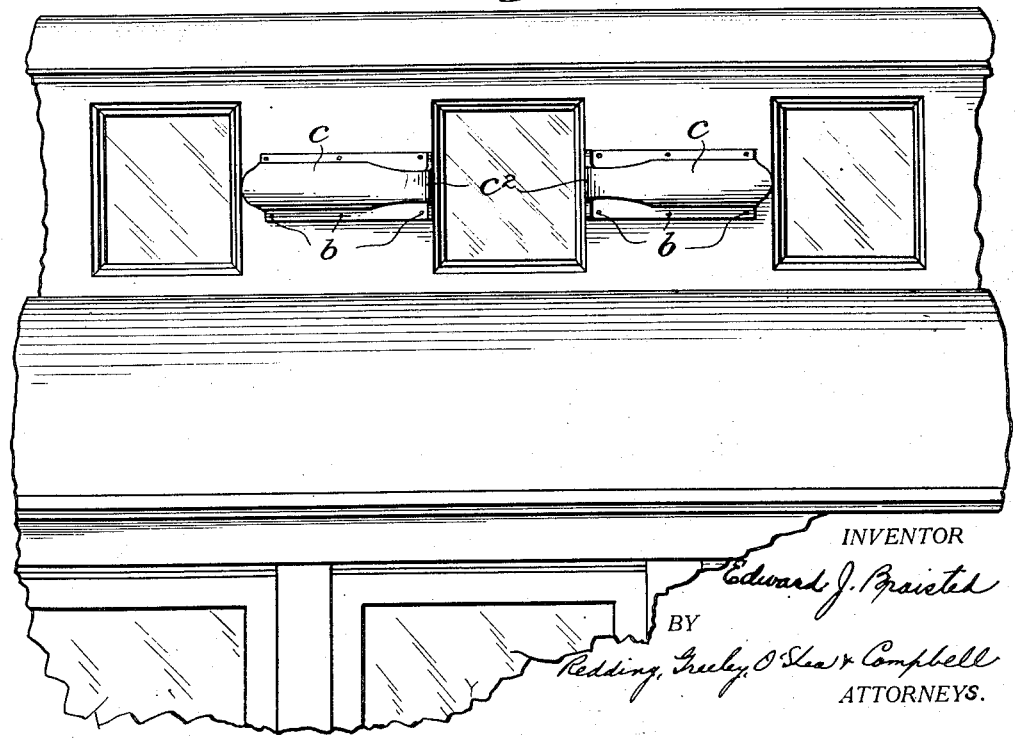
INVENTOR
Edward J. Braisted
BY
Redding, Greeley, O'Shea & Campbell
ATTORNEYS.

Patented Mar. 18, 1924.

1,487,507

UNITED STATES PATENT OFFICE.

EDWARD J. BRAISTED, OF FLUSHING, NEW YORK.

VENTILATOR FOR VEHICLES.

Application filed March 24, 1923. Serial No. 627,257.

*To all whom it may concern:*

Be it known that I, EDWARD J. BRAISTED, a citizen of the United States, residing at Flushing, Long Island, in the city of New York, State of New York, have invented certain new and useful Improvements in Ventilators for Vehicles, of which the following is a specification, reference being had to the accompanying drawing, forming a part hereof.

It has been proposed to employ ventilators for vehicles employing the eductor principle wherein movement of the vehicle causes a current of air to pass over a discharge duct with sufficient velocity to draw the air from the interior of the vehicle. However, these devices have been open to objection in certain respects prominent among which is the inflow of air through the discharge duct when the vehicle is at rest. To avoid this condition it has been proposed to associate valves or shutters with the outlet duct but these require manual operation and attention when, as in the case of a motor vehicle, it is left standing. Again, in known ventilators of the character referred to no provision has been made for securing ventilation when the vehicle is at rest. Again, in cases where a vehicle travels in different directions at different times known ventilators must be changed to suit each direction of travel.

The object of the present invention is to provide a ventilator which shall be of simple and inexpensive construction, permanently attachable to enclosed vehicles adapted to travel in one or both directions and automatically operable to prevent, under all conditions of use, the inflow of cold air into the vehicle regardless of the direction of travel, and to assure, when the vehicle is at rest, continued ventilation so long as there is any air stirring.

The preferred embodiment includes an open-ended case through which the air normally flows, an eductor nozzle communicating with the interior of the vehicle, and a transverse baffle at the end of the open channel to prevent the reverse flow of air therethrough into the eductor nozzle. Lateral ports for the discharge of the current of air flowing over the eductor nozzle are provided in the side walls thereof adjacent to the end baffle, these ports permitting the transverse flow of air currents with an eductor action when the vehicle is at rest. In the case of vehicles adapted to travel in different directions it is preferred to mount the improved ventilator in pairs with the open ends arranged in opposite directions so that the freest possible ventilation will be assured in either direction of travel, the baffle plate in each unit, however, preventing the inflow of cold air when the vehicle moves in the opposite direction.

The invention will be described with reference to the preferred embodiment illustrated in the accompanying drawings wherein:

Figure 1 is a view in horizontal section through a ventilator embodying the improvements and showing its application to the wall of an enclosed vehicle, the view being taken on the plane indicated by the line 1—1 of Figure 2 and looking in the direction of the arrows.

Figure 2 is a view in side elevation thereof part of the outer wall being broken away to show the eductor nozzle.

Figure 3 is a view in side elevation showing the application of a pair of the ventilators to a vehicle adapted to travel in different directions.

The wall of the vehicle such as an automobile, street or rail car, is indicated at $a$ as having secured thereto by suitable screws $b$ the improved unitary ventilator. This ventilator includes an outer wall $c$ constituting a through channel having an open end $c'$ which when the ventilator is secured in place is presented to receive air currents created by its movement. Disposed within the channel $c$ is an outlet duct $d$ formed with a wall $d'$ and extending through the vehicle wall $a$ and communicating with the interior of the vehicle to discharge air therefrom. This outlet duct $d$ terminates substantially centrally of the outer channel $c$ and in the direction of the air currents which flow therethrough so that an eductor action is impressed on the body of air within the vehicle by the air currents and constant circulation thereby produced. This principle is old. However, in a device of this kind it is evident that when the vehicle is standing still some means must be provided to prevent the inflow of cold air into the vehicle body through the outlet duct $d$. Such means have usually taken the form of manually operable valves or shutters. One of the objects of the present invention is to provide a simple and inexpensive unitary device which shall be free from moving parts and shall itself automatically prevent the inflow of cold air into the vehicle body. To this end, the outer wall $c$ terminates in a transverse baffle $c^2$ opposite to the open end $c'$ and the air currents flowing through the channel escape through lateral ports $c^3$ formed in the side of the wall $c$.

From the description given the operation of the improved device should be apparent. The embodiment illustrated in Figures 1 and 2 is applied to a vehicle moving in one direction only in which case one such ventilator may be sufficient at each side, as in the case of a closed automotive vehicle. When the vehicle moves forward air currents flow through the channel $c$ and draw air from the interior, all of the air eventually escaping through the lateral ports $c^3$. When the vehicle is standing still the end baffle $c^2$ prevents air from flowing into the eductor nozzle $d$. In fact, it has been found that the relation of parts is such that eddies may whirl through the ports $c^3$ from one to another and actually induce a draft which will impress an eductor action on the end of the nozzle $d$ and create some degree of ventilation when the vehicle is at rest.

In the case of street and rail cars provision must be made for ventilation regardless of the direction of travel of the car. The improved ventilator may be applied to such cars and automatically furnish proper ventilation under any conditions of use without requiring any manual setting. As illustrated in Figure 3 two such ventilators are indicated by the reference character $c$ applied to their outer walls. These units are placed end to end so that when the vehicle travels in one direction the open end of one ventilator is presented and when the vehicle travels in the opposite direction the open end of the other ventilator is presented. The end baffle $c^2$ incorporated in each unit will prevent the air from rushing in the reverse direction through its eductor nozzle, as described with reference to the units shown in Figures 1 and 2. When the vehicle is standing still one or the other of the units $c$ will most likely receive any air that is stirring and convey it across the eductor nozzle for the purpose of inducing ventilation.

Changes in form and dimensions may be made without departing from the invention so long as the unitary character of the structure is preserved with the attendant advantages.

What I claim is:

1. A ventilator of the character described including an outer casing constituting an open-ended channel adapted to receive air currents, a transverse baffle closing the other end of the casing, said casing being provided with lateral ports to permit the escape of air in proximity to said baffle, and an eductor nozzle disposed within the channel formed by the casing and communicating with the interior of the vehicle.

2. As an article of manufacture an integral ventilator including an outer wall forming a channel and having an open end to receive air currents, a transverse wall to close the other end of said channel, said first named wall being formed with lateral opposed ports in proximity to the second named wall for the escape of air and an eductor nozzle disposed within the channel and communicating with the interior of the vehicle.

This specification signed this 14th day of March A. D. 1923.

EDWARD J. BRAISTED.